US012588076B2

(12) United States Patent
Amaya-Gonzalez

(10) Patent No.: US 12,588,076 B2
(45) Date of Patent: Mar. 24, 2026

(54) COVERAGE-BASED ROBUST AND EFFICIENT RANDOM ACCESS FOR FIFTH GENERATION (5G) NETWORKS

(71) Applicant: DISH Wireless L.L.C., Englewood, CO (US)

(72) Inventor: Norberto Amaya-Gonzalez, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 605 days.

(21) Appl. No.: 17/903,829

(22) Filed: Sep. 6, 2022

(65) Prior Publication Data

US 2024/0040631 A1 Feb. 1, 2024

Related U.S. Application Data

(60) Provisional application No. 63/392,990, filed on Jul. 28, 2022.

(51) Int. Cl.
| | |
|---|---|
| *H04W 74/08* | (2024.01) |
| *H04L 1/00* | (2006.01) |
| *H04W 52/24* | (2009.01) |
| *H04W 74/0833* | (2024.01) |

(52) U.S. Cl.
CPC ....... *H04W 74/0841* (2013.01); *H04L 1/0003* (2013.01); *H04W 52/242* (2013.01)

(58) Field of Classification Search
None
See application file for complete search history.

(56) References Cited

U.S. PATENT DOCUMENTS

| | | | | |
|---|---|---|---|---|
| 10,057,923 | B2 * | 8/2018 | Ratasuk | H04W 74/004 |
| 10,477,577 | B2 * | 11/2019 | Jeon | H04W 52/325 |
| 11,013,038 | B2 * | 5/2021 | Guo | H04W 72/0446 |
| 11,019,656 | B2 * | 5/2021 | Vajapeyam | H04W 24/08 |
| 2019/0260495 | A1 * | 8/2019 | Nammi | H04L 1/0016 |
| 2020/0028609 | A1 * | 1/2020 | Ahn | H04L 1/00 |
| 2021/0045023 | A1 * | 2/2021 | Kim | H04W 56/0045 |
| 2021/0219345 | A1 * | 7/2021 | Agiwal | H04W 52/362 |
| 2021/0352712 | A1 * | 11/2021 | Ly | H04W 76/11 |
| 2022/0272758 | A1 * | 8/2022 | Agiwal | H04W 74/0833 |
| 2022/0361236 | A1 * | 11/2022 | Gao | H04W 52/242 |
| 2024/0137145 | A1 * | 4/2024 | Levitsky | H04L 1/0025 |
| 2024/0284451 | A1 * | 8/2024 | Park | H04W 72/0457 |

* cited by examiner

*Primary Examiner* — Khaled M Kassim
*Assistant Examiner* — Ahmed Saifuddin
(74) *Attorney, Agent, or Firm* — Kipman T. Werking; Frontier IP Law PLLC

(57) ABSTRACT

Disclosed are systems and methods for coverage-based robust and efficient random access for 5G networks which uses a higher Aggregation Level (AL) and lower and Modulation and Coding Scheme (MCS) the larger the Path Loss (PL) between the user equipment (UE) and the base station. To do so, the message preamble of the Random Access Channel (RACH) message received from the UE by the base station (gNB) is associated with the PL between the base station and the UE, and is thus used to determine the AL and MCS.

20 Claims, 7 Drawing Sheets

100

CELL BASE STATION
(e.g., 5G NR gNB)

106 — TRANSCEIVER

108 — TRANSMISSION
FILTER

110 — RECEIVING FILTER

102

112 — MEMORY
RESOURCES

114 — PROCESSING
RESOURCES

116 — AGGREGATION LEVEL
AND MCS
DETERMINATION
MODULE

USER EQUIPMENT (UE) — 104a

120

USER EQUIPMENT (UE) — 104b

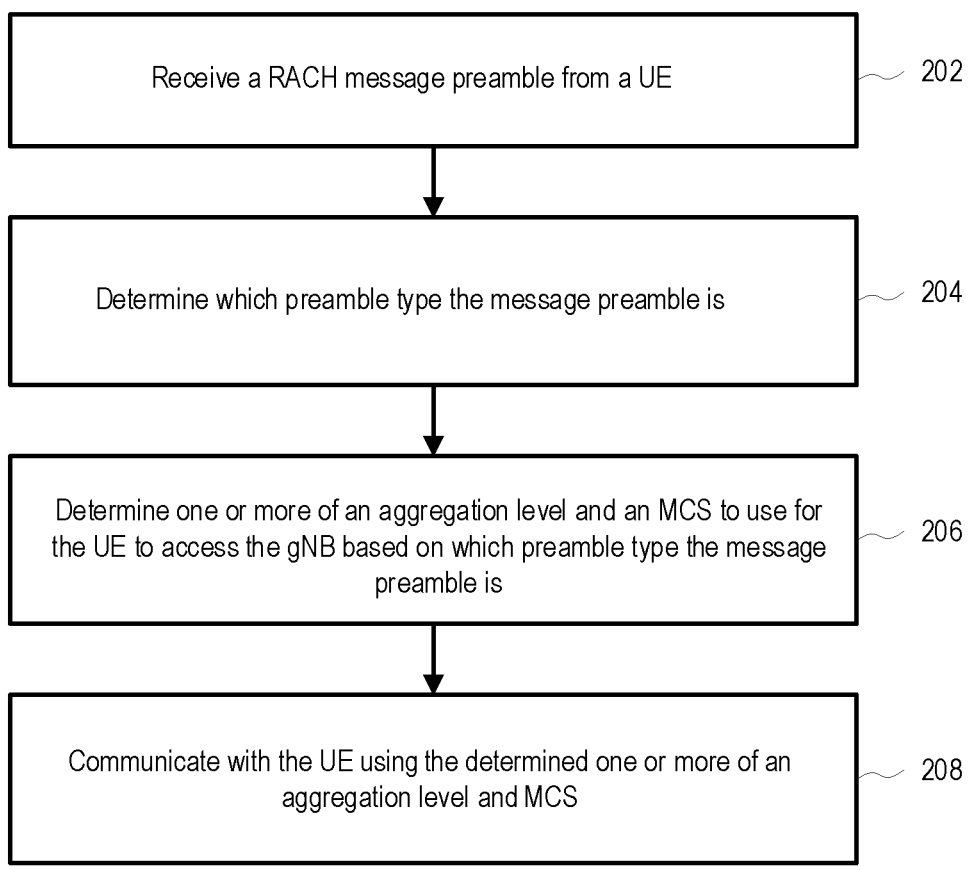
Receive a RACH message preamble from a UE — 202
Determine which preamble type the message preamble is — 204
Determine one or more of an aggregation level and an MCS to use for the UE to access the gNB based on which preamble type the message preamble is — 206
Communicate with the UE using the determined one or more of an aggregation level and MCS — 208
FIG. 2

300
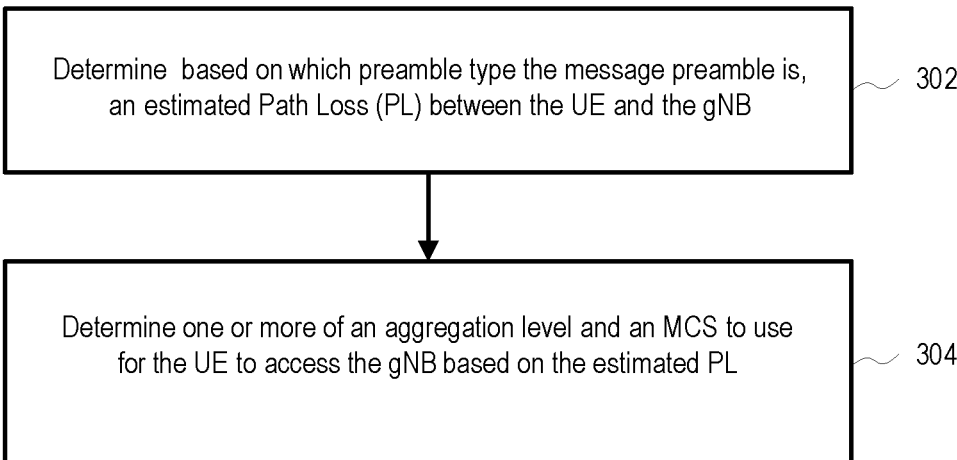
Determine based on which preamble type the message preamble is, an estimated Path Loss (PL) between the UE and the gNB    302
Determine one or more of an aggregation level and an MCS to use for the UE to access the gNB based on the estimated PL    304
FIG. 3

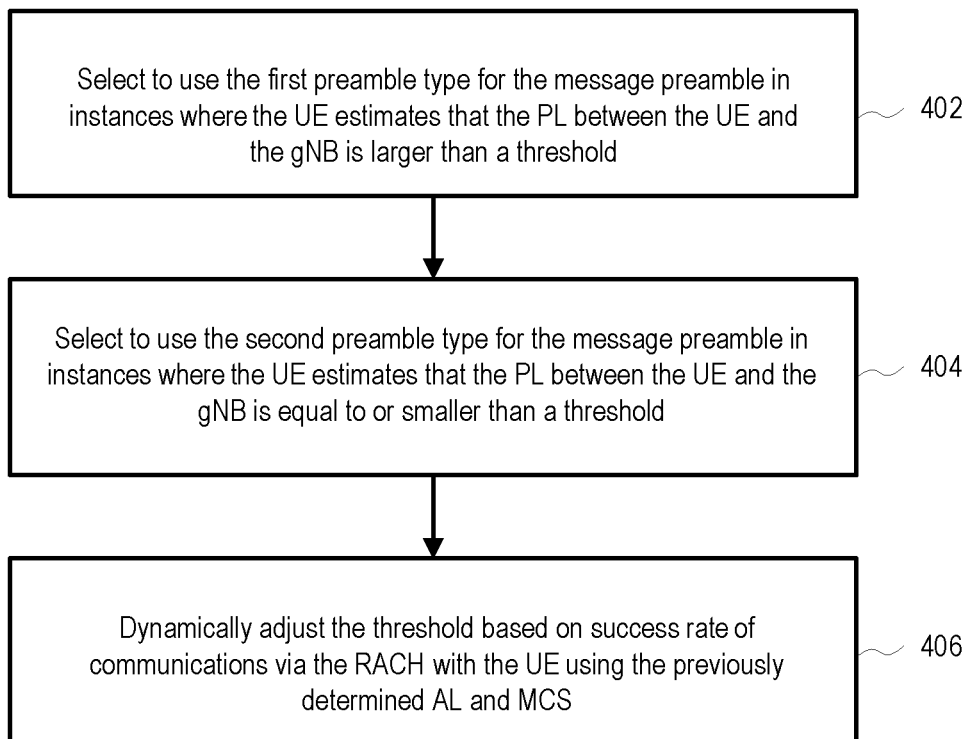

Select to use the first preamble type for the message preamble in instances where the UE estimates that the PL between the UE and the gNB is larger than a threshold    402

Select to use the second preamble type for the message preamble in instances where the UE estimates that the PL between the UE and the gNB is equal to or smaller than a threshold    404

Dynamically adjust the threshold based on success rate of communications via the RACH with the UE using the previously determined AL and MCS    406

FIG. 4

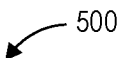
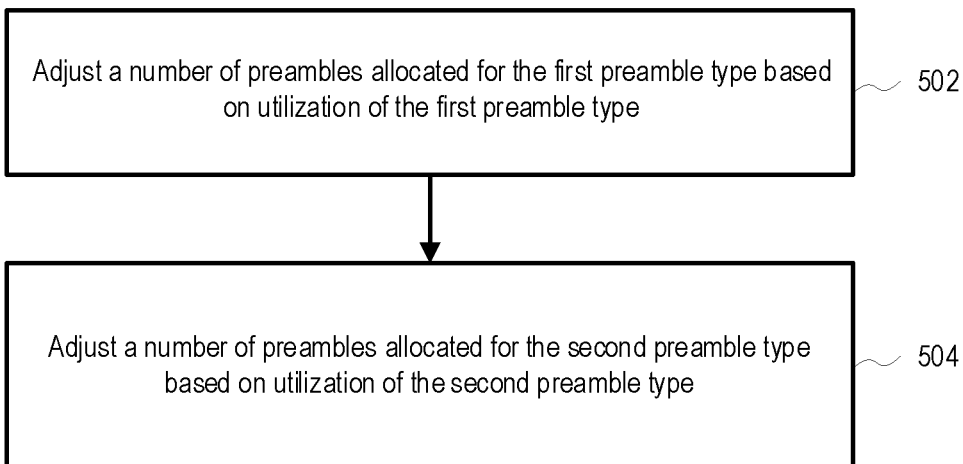
500
Adjust a number of preambles allocated for the first preamble type based on utilization of the first preamble type        502
Adjust a number of preambles allocated for the second preamble type based on utilization of the second preamble type        504
FIG. 5

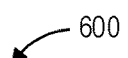

Preamble detected on gNB Cell within expected range as per ZCZCandRSI configuration — 602

Preamble Index < numberOfRA-PreamlesGroupA — 604

Yes — Group A

GrpA_Att ++ — 608

Send RAR with
AL = AL_RAR_GrpA
MCS = MCS_RAR_GrpA
Carrying UL grant for MSG3 with
AL = AL_MSG3_GrpA
MCS = MCS_MSG3_GrpA
TBS = TBS_MSG3_GrpA GrpA_RAR ++

Wait for MSG3 from UE — 614

GrpA_MSG3 ++

Send MSG4 with
AL = AL_MSG4_GrpA
MCS = MCS_MSG4_GrpA — 622

622        620

Send RRC Setup with
AL = AL_RRCsetup_GrpA
MCS = MCS_RRCsetup_GrpA

No — Preamble Index < cb-PreamblesPerSSB — 606

Yes — Group B — 610

GrpB_Att ++

Send RAR with
AL = AL_RAR_GrpB
MCS = MCS_RAR_GrpB
Carrying UL grant for MSG3 with
AL = AL_MSG3_GrpB
MCS =MCS_MSG3_GrpB
TBS = TBS_MSG3_GrpB GrpB_RAR ++

Wait for MSG3 from UE — 616

GrpB_MSG3 ++ — 618 628

Send MSG4 with
AL = AL_MSG4_GrpB
MCS = MCS_MSG4_GrpB 626        624

Send RRC Setup with
AL = AL_RRCsetup_GrpB
MCS = MCS_RRCsetup_GrpB

No — Contention Free

CFRA_Att ++

Send RAR with
AL = AL_RAR_CFRA
MCS = MCS_RAR_CFRA
Carrying UL grant for RRC
Reconfiguration Complete with
AL = AL_MSG3_CFRA
MCS =MCS_MSG3_CFRA
TBS = TBS_MSG3_CFRA — 612

CFRA_RAR ++

Wait for RRC
Reconfiguration
Complete from UE — 618

CFRA_MSG3 ++

Continue session after
successful HO

Both MSG4 and RRC Setup could
be transmitted in the same
message using RRC Setup
parameters

702 — Begin

704 — Update_Period has Elapsed?

No

Yes

706 — Set PRACH_Att = GrpA_Att + GrpB_Att + CFRA_Att

708 — PRACH_Att > Att_Thresh ?

Yes

No

710 — Set cb-PreamblesPerSSB = 64 - Max(CF_Preamble_Min, Min(CF_Premble_Max, floor(64 x CFRA_Att / PRACH_Att)))

712 — Set numberOfRA- Preambles GroupA = Max(GrpA_Preamble_Min, Min (GrpA_Preamble_Max, Floor (GrpA_Att x (64-cb-PreamblesPerSSB) / (GrpA_Att + GrpB_Att) )))

714 — End

COVERAGE-BASED ROBUST AND EFFICIENT RANDOM ACCESS FOR FIFTH GENERATION (5G) NETWORKS

BACKGROUND

It is advantageous to have robust and efficient random access for 5G wireless telecommunication networks. However, doing so in an efficient manner while saving network resources is often challenging.

BRIEF SUMMARY

In 5G wireless networks, it is generally beneficial to use a higher Aggregation Level (AL) and lower and Modulation and Coding Scheme (MCS) the farther away the user equipment (UE) is from the base station to achieve for robust random access to the network. However, a cellular (cell) base station, such as a Next Generation Node B (gNB) in 5G networks, is traditionally not able to easily differentiate how far a particular UE is physically from the base station or the Path Loss (PL) between the gNB and the UE during the RACH phase. PL, or path attenuation, is the reduction in power density (attenuation) of an electromagnetic wave as it propagates through space. PL may result from the influence of terrain and atmospheric components on the channel of communication. This forces the base station to use the highest AL and lowest MCS for the UE to access the gNB to ensure the most robust communication on the Random Access Channel (RACH). Disclosed herein is a system for coverage-based robust and efficient random access for 5G networks in which the message preamble of the RACH message received from the UE by the base station is associated with how far away that UE is physically from the base station, and is thus used to determine the AL and MCS to use.

The system dynamically adjusts a threshold estimated PL between the UE and the gNB for determining which preamble type to use based on success rate of communications via the RACH with the UE using a determined AL and MCS. The system also adjusts a number of preambles allocated for the a preamble type and a preamble type based on utilization of the first preamble type and the second preamble type in communications via the RACH with the UE.

BRIEF DESCRIPTION OF THE DRAWINGS

FIG. 2 is a flow diagram of a method for coverage-based robust and efficient random access for 5G networks, according to one embodiment.

FIG. 3 is a flow diagram of a method for determining one or more of an AL and MCS to use for the UE to access the gNB, according to one embodiment.

FIG. 4 is a flow diagram of a method for dynamically adjusting the threshold for selecting a preamble type based on success rate of communications via the RACH with the UE, according to one embodiment.

FIG. 5 is a flow diagram of a method for adjusting a number of preambles allocated to different preamble types, according to one embodiment.

FIG. 6 is a flow diagram of an example algorithm for coverage-based robust and efficient random access for 5G networks, according to one embodiment.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
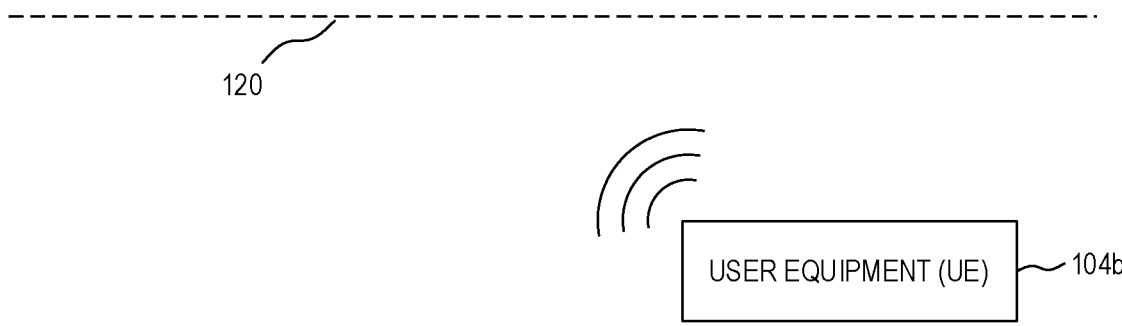
FIG. 1 is a block diagram of a wireless communication system, according to one embodiment.

FIG. 1 is a block diagram of a wireless communication system 100, according to one embodiment. The wireless communication system 100 includes a cell base station 102, which may be, for example, a fifth generation (5G) base station that uses 5G New Radio (NR) technology as specified in the 3GPP 5G Release 15 specification set, and is referred to as a gNodeB (gNB). Also shown is example user equipment (UE) 104a at a particular PL from the base station 102 and another example UE 104b farther away from the base station 102 than UE 104a. UE 104a and/or UE 104b, for example, may be cellular telephones, smartphones, tablet devices, Internet of Things (IoT) devices other cellular-enabled devices, etc. The base station 102 enables the UE 104a and UE 104b to communicate wirelessly with other UEs or to send and receive data via the Internet.

The base station 102 includes a transceiver 106, a transmission filter 108, a receiving filter 110, memory resources 112, and processing resources 114. The transceiver 106 transmits mobile communication signals to the UE 104, to other base stations, and to other communication systems to enable mobile communication and access to the Internet. The memory resources 112 include one or more computer readable media that store software instructions for establishing a mobile communication network with the base station 102 and may also include software instructions that comprise AL and Modulation and Coding Scheme (MCS) determination module 116 that implements or facilitates implementation of coverage-based robust and efficient random access for 5G networks as described herein. The processing resources 114 execute the instructions stored in one or more computer readable media of the memory resources 112. As set forth in more detail below, executing the software instructions, such as those of AL and MCS determination module 116, causes the base station 102 to implement coverage-based robust and efficient random access for 5G networks.

In one embodiment, the communication system 100 is a 3GPP network. The communication system 100 can include a 5G NR network. However, the communication system 100 can include other types of networks without departing from the scope of the present disclosure.

In a 5G NR network, different ALs can be used for Physical Downlink Control Channel (PDCCH) transmissions. The AL is the number of Control Channel Element (CCEs) used for a PDCCH candidate. Currently, possible 5G NR PDCCH ALs are 1, 2, 4, 8, 16. A higher AL provides better coverage and is more suitable for larger cells and extreme coverage scenarios, including when the UE is physically farther from the base station, such as the edge of the cell, but at the cost of more CCEs and consequently more time-frequency resources.

For communication technology generally, the MCS defines the numbers of useful bits which can be carried by one symbol. In 5G, a symbol of one subcarrier is defined as Resource Element (RE) and the MCS defines how many useful bits can be transmitted per Resource Element (RE). The gNB instructs the UE to select a specific MCS table using a combination of Radio Resource Control (RRC) signaling (using information elements (IEs)) and physical layer signaling (using Downlink Control Information (DCI)). The MCS may depend on radio signal quality in a wireless link. The better the quality, the higher the MCS and the more useful bits can be transmitted on a Resource Element (RE). Lower signal quality results in lower MCS, which means less useful data can be transmitted on a Resource Element (RE), but provides more robust communication for use on lower quality links. For example, a UE being farther away from the base station, such at the edge of the cell may contribute to a lower quality link. Thus, in such instances it may be advantageous to use a lower MCS.

Thus, it is generally advantageous to use a higher AL and lower MCS the higher the PL between the UE and the base station. However, a cell base station, such as a gNB, is traditionally not able to calculate the PL between a particular UE and the base station during the Random Access phase. This forces the base station to use the highest AL and lowest MCS for the UE to access the gNB to ensure the most robust communication on the Random Access Channel (RACH). Disclosed herein is a system 100 for coverage-based robust and efficient random access for 5G networks in which the message preamble of the RACH message received from the UE (e.g., UE 104a or UE 104b) by the base station 102 is associated with the PL between the base station 102 and the UE (e.g., UE 104a or UE 104b).

The AL and MCS determination module 116 determines, based on which preamble type the RACH message preamble is, an estimated PL between the UE and the base station. The AL and MCS determination module 116 then determines the AL and an MCS to use for the UE to access the base station based on the estimated PL between the UE and the base station as determined according to the preamble type. In an example embodiment, the AAL and MCS determination module 116 determines to use a higher level of aggregation and lower MCS in response to the preamble type being determined to be a first preamble type that is associated with the UE (such as UE 104b) being farther away physically from the base station 102 and experiencing a higher PL relative to using a lower level of aggregation and higher MCS in response to the preamble type being determined to be a second preamble type associated with the UE (such as UE 104a) being closer physically to the base station and experiencing a lower PL.

In an example embodiment, before the base station 102 receives the message preamble from the UE, the UE selects which preamble type to use for the message preamble based on an estimated PL between the UE and the base station 102. A first preamble type is associated with the UE (such as UE 104b) being relatively farther away physically from the base station 102 and experiencing a larger PL and a second preamble type is associated with the UE (such as UE 104a) being relatively closer physically to the base station and experiencing a lower PL. For example, the UE may select to use the first preamble type for the message preamble in instances where the UE is farther than a threshold estimated Path Loss (marked by dashed line 120) from the base station 102, such as in the case UE 104b. On the other hand, the UE may select to use the second preamble type for the message preamble in instances where the UE is equal to or closer than the threshold estimated Path Loss (marked by dashed line 120) from the base station 102, such as in the case of UE 104a. Furthermore, the system 100 may dynamically adjust the threshold based on success rate of communications via the RACH with the UE using the determined AL and MCS.

Additionally, in various example embodiments, the system 100 may adjust the number of preambles allocated for the first preamble type based on utilization of the first preamble type in communications via the RACH with the UE. Also, the system 100 may adjust the number of preambles allocated for the second preamble type based on utilization of the second preamble type in communications via the RACH with the UE. An example algorithm for doing so is described further herein with respect to FIG. 7.

FIG. 2 is a flow diagram of a method 200 for coverage-based robust and efficient random access for 5G networks, according to one embodiment.

At 202, a gNB in a 5G NR wireless network receives a RACH message preamble from a UE on the 5G NR network. Before the gNB receives the message preamble from the UE, the UE may select which preamble type to use for the message preamble based on an estimated PL between the UE and the gNB. A first preamble type is associated with the UE being relatively farther away physically from the gNB and experiencing a higher PL and a second preamble type is associated with the UE being relatively closer physically to the gNB and experiencing a lower PL. In an example embodiment, the preamble type is determined from a plurality of preamble types including a 5G NR Group A preamble type and a 5G NR Group B preamble type.

At 204, the gNB determines which preamble type the message preamble is.

At 206, the gNB determines one or more of an AL and an MCS to use for the UE and gNB to exchange subsequent messages during the RACH phase based on which preamble type the message preamble is.

At 208, the gNB communicates via the RACH with the UE using the determined one or more of an AL and MCS.

FIG. 3 is a flow diagram of a method 300 for determining one or more of an AL and MCS to use for the UE to access the gNB, according to one embodiment.

At 302, the gNB determines, based on which preamble type the message preamble is, an estimated PL between the UE and the gNB.

At 304, the gNB determines one or more of an AL and an MCS to use for the UE and gNB to exchange subsequent messages during the RACH phase based on the estimated PL between the UE and the gNB determined according to the preamble type. For example, the gNB may determine to use a higher AAL and lower MCS in response to the preamble type being determined to be a first preamble type that is associated with the UE experiencing a larger PL relative to using a lower level of aggregation and higher MCS in response to the preamble type being determined to be a second preamble type associated with the UE experiencing a lower PLPL from the gNB.

FIG. 4 is a flow diagram of a method 400 for dynamically adjusting the threshold for selecting a preamble type based on success rate of communications via the RACH with the UE, according to one embodiment.

At 402 the UE selects to use the first preamble type for the message preamble in instances where the UE estimates that the PL between the UE and the gNB is larger than a threshold.

At 404 the UE selects to use the second preamble type for the message preamble in instances where the UE estimates that the PL between the UE and the gNB is equal to or smaller than a threshold.

At 406, the system dynamically adjusts the threshold based on success rate of communications of the gNB with the UE via the RACH using the previously determined AL and MCS.

FIG. 5 is a flow diagram of a method 500 for adjusting a number of preambles allocated to different preamble types, according to one embodiment.

At 502, the gNB adjusts a number of preambles allocated for the first preamble type based on utilization of the first preamble type in communications via the RACH with the UE.

At 504, the gNB adjusts a number of preambles allocated for the second preamble type based on utilization of the second preamble type in communications via the RACH with the UE.

FIG. 6 is a flow diagram of an example algorithm 600 for coverage-based robust and efficient random access for 5G networks, according to one embodiment.

At 602, the procedure starts when a valid preamble is detected by the gNB on one of its cells.

At 604 and 606, based on the received Random Access Preamble Index (RAPID) and the current Physical Random Access Channel (PRACH) configuration, the gNB is able to determine if the preamble corresponds to Group A, Group B or Contention Free Random Access (CFRA). This is performed by comparing the received RAPID with the following information elements (IEs) transmitted by the cell to the UE via radio resource control (RRC) signaling: numberOfRA, PreamblesGroupA and cbPreamblesPerSSB. Once the preamble type has been identified, the corresponding counter is increased, i.e., GrpA_Att, GrpB_Att or CFRA_Att for Group A, Group B or CFRA preambles, respectively. These counters are subsequently used by the algorithm 600 to automatically configure the values of numberOfRA-PreamblesGroupA and cb-PreamblesPerSSB.

At 608, 610 and 612, the Physical Downlink Control Channel (PDCCH) AL and the MCS used for the Random Access Response (RAR) transmission are selected based on the preamble type with the possibility to configure different values, as shown in FIG. 6, using the following variables: AL_RAR_GrpA, AL_RAR_GrpB and AL_RAR_CFRA, and also MCS_RAR_GrpA, MCS_RAR_GrpB and MCS_RAR_CFRA. The RAR carries the UL grant for 5G NR MSG3 for which AL, MCS and TransporBlock Size (TBS) also depend on the preamble type, and, as shown in FIG. 6, are configured with the following variables: AL_MSG3_GrpA, AL_MSG3_GrpB and AL_MSG3_CFRA; MCS_MSG3_GrpA, MCS_MSG3_GrpB and MCS_MSG3_CFRA; and TBS_MSG3_GrpA, TBS_MSG3_GrpA and TBS_MSG3_CFRA.

At 614 and 616, the gNB waits for 5G NR MSG3 from the UE and once MSG3 is received the gNB increments either one of the GrpA_MSG3 or GrpB_MSG3 counters.

5G NR MSG4 and RRC setup may be transmitted separately or in the same message. When transmitted separately each message uses its corresponding parameters. When transmitted in the same message the RRC setup parameters are used. The corresponding variables are: AL_MSG4_GrpA, AL_MSG4_GrpB, AL_RRCsetup_GrpA and AL_RRCsetup_GrpB; and MCS_MSG4_GrpA, MCS_MSG4_GrpB, MCS_RRCsetup_GrpA and MCS_RRCsetup_GrpB.

At 620 the gNB sends MSG4 to the UE with AL=AL_MSG4_GrpA and MCS=MCS_MSG4_GrpA. Then, at 622, RRC setup is sent with AL=AL_RRCsetup_GrpA and MCS=MCS_RRCsetup_GrpA.

At 624, the gNB sends MSG4 to the UE with AL=AL_MSG4_GrpB and MCS=MCS_MSG4_GrpB. Then, at 626, RRC setup is sent with AL=AL_RRCsetup_GrpB and MCS=MCS_RRCsetup_GrpB.

At 612 after sending the RAR the gNB increments CFRA_RAR counter accordingly and at 618 the gNB waits for RRC reconfiguration from the UE. Once the RRC reconfiguration is received by the gNB the CFRA_MSG3 counter is incremented and at 628 the session is continued after successful handoff.

The variables mentioned above may have fixed values or may be configurable per cell, site, centralized unit (CU), distributed unit (DU), cluster or network wide, e.g., by means of appropriate radio access network (RAN) configuration parameters.

In an example embodiment, appropriate values of AL and MCS for cell-edge coverage are configured on Group A parameters. On the other hand, AL and MCS for Group B are preferably set for more efficient but less robust transmissions (i.e. lower AL and higher MCS) than Group A values. The optimum Group B parameter configuration depends on the setting of the IE messagePowerOffsetGroupB, among other factors.

Figure 7:
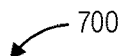
FIG. 7 is a flow diagram of an example algorithm for adjusting a number of preambles allocated to different preamble types including adjusting the number of 5G Group A, Group B and Contention Free Random Access (CFRA) preambles based on preamble group utilization, according to one embodiment.

FIG. 7 is a flow diagram of an example algorithm 700 for adjusting a number of preambles allocated to different preamble types including adjusting the number of 5G Group A, Group B and Contention Free Random Access (CFRA) preambles based on preamble group utilization, according to one embodiment. This PRACH parameter optimization procedure of example algorithm 700 is used to configure the values of the parameters cb-PreamblesPerSSB and numberOfRA-PreamblesGroupA. The procedure may be triggered manually or automatically and the procedure may be executed manually or automatically.

The process begins at 702.

At 704, after a parameter modification there is a minimum period of time during which the parameters are unchanged, namely update_period, which may be fixed or configurable, i.e., by a relevant RAN parameter. It is at this point where it is determined whether that period has elapsed. If the period has elapsed the process continues to 706. Otherwise, the process ends at 714.

At 706, the values of the number of PRACH attempts, i.e., received MSG1 per preamble type, detected by the gNB on the specific cell where the optimization is performed, is updated. In the present example, that such counters are named GrpA_Att, GrpB_Att or CFRA_Att for Group A, Group B or CFRA preambles, respectively. Thus, the values of the number of PRACH attempts is set as PRACH_Att=GrpA_Att+GrpB_Att+CFRA_Att.

At 708, there is also a minimum number of attempts required to modify the current settings, namely Att_Thresh, which could be fixed or configurable, i.e., by a relevant RAN parameter. It is at this point where it is determined whether the number of PRACH attempts has met that minimum threshold. If the number of PRACH attempts has met that minimum threshold, the process continues to 710. If not, then the process ends at 714.

At 710 and then 712, the values of cb-PreamblesPerSSB are calculated and then the numberOfRA-PreamblesGroupA are calculated according to the formulae displayed at 710 and 712, respectively. In an example embodiment, the values of cb-PreamblesPerSSB and numberOfRA-Preambles-GroupA are restricted to respective ranges defined by minimum and maximum values. In particular, CF_Preamble_Min is the minimum number of CFRA preambles; CF_Preamble_Max is the maximum number of CFRA preambles; GrpA_Preamble_Min is the minimum number of Group A preambles; and GrpA_Preamble_Max is the maximum number of Group A preambles. After the new values are calculated the parameters are updated using standard RRC signaling, e.g., System Information Block 1 (SIB1), RRC Setup, RRC Reconfiguration.

The process ends at 714.

The embodiments described above may use synchronous or asynchronous client-server computing techniques. However, one or more of the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, cloud computing, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a Next Generation Node B (gNB) in a fifth generation (5G) New radio (NR) wireless network, a random access channel (RACH) message preamble from a user equipment device (UE) on the 5G NR network;

determining, by the gNB, which preamble type the message preamble is;

determining, by the gNB, an Aggregation Level (AL) and a Modulation and Coding Scheme (MCS) to use for the UE and gNB to exchange subsequent messages during a RACH phase based on which preamble type the message preamble is; and the gNB communicating during the RACH phase with the UE using the determined AL and MCS;

wherein the determining the AL and the MCS to use includes:

determining, based on which preamble type the message preamble is, an estimated Path Loss (PL) between the UE and the gNB; and determining, by the gNB, the AL and the MCS to use for the UE and gNB to exchange subsequent messages during the RACH phase based on the estimated PL between the UE and the gNB determined according to the preamble type.

2. The method of claim 1 wherein the estimated Path Loss is determined using a configurable threshold.

3. The method of claim 2 wherein determining, by the gNB, the AL and the MCS to use for the UE to access the gNB includes:

determining to use a higher level of aggregation and lower MCS in response to the preamble type being determined to be a first preamble type that is associated with the UE experiencing a larger PL relative to using a lower level of aggregation and higher MCS in response to the preamble type being determined to be a second preamble type associated with the UE experiencing a smaller PL from the gNB.

4. The method of claim 1, further comprising:

before the gNB receives the message preamble from the UE, selecting, by the UE, which preamble type to use for the message preamble based on an estimated PL between the UE and the gNB, wherein a first preamble type is associated with the UE experiencing a larger PL from the gNB and a second preamble type is associated with the UE experiencing a smaller PL from the gNB.

5. The method of claim 4, wherein the selecting which preamble type to use includes:

selecting, by the UE, to use the first preamble type for the message preamble in instances where the estimated PL between the gNB and the UE is larger than a threshold; and selecting, by the UE, to use the second preamble type for the message preamble in instances where the estimated PL between the gNB and the UE is smaller thana the threshold.

6. The method of claim 5, further comprising:

dynamically adjusting the threshold based on a success rate of communications via the RACH with the UE using the determined AL and MCS.

7. The method of claim 4, further comprising:

adjusting a number of preambles allocated for the first preamble type based on utilization of the first preamble type in communications via the RACH with the UE; and adjusting a number of preambles allocated for the second preamble type based on utilization of the second preamble type in communications via the RACH with the UE.

8. The method of claim 1 wherein the preamble type is determined from a plurality of preamble types including a 5G NR Group A preamble type and a 5G NR Group B preamble type.

9. A system comprising:

at least one processor; and a memory coupled to the at least one processor, the memory storing instructions that, when executed by the at least one processor, cause the system to perform operations including:

receiving, by a Next Generation Node B (gNB) in a fifth generation (5G) New radio (NR) wireless network, a random access channel (RACH) message preamble from a user equipment device (UE) on the 5G NR network;

determining, by the gNB, which preamble type the message preamble is;

determining, by the gNB, an Aggregation Level (AL) and a Modulation and Coding Scheme (MCS) to use for the UE and gNB to exchange subsequent messages during a RACH phase based on which preamble type the message preamble is; and the gNB communicating during the RACH phase with the UE using the determined AL and MCS;

wherein the determining the AL and the MCS to use includes:

determining, based on which preamble type the message preamble is, an estimated Path Loss (PL) between the UE and the gNB; and determining, by the gNB, the AL and the MCS to use for the UE and gNB to exchange subsequent messages during the RACH phase based on the estimated PL between the UE and the gNB determined according to the preamble type.

10. The system of claim 9 wherein the estimated Path Loss is determined using a configurable threshold.

11. The system of claim 10 wherein determining, by the gNB, the AL and the MCS to use for the UE to access the gNB includes:

determining to use a higher level of aggregation and lower MCS in response to the preamble type being determined to be a first preamble type that is associated with the UE experiencing a larger PL from the gNB relative to using a lower level of aggregation and higher MCS in response to the preamble type being determined to be a second preamble type associated with the UE experiencing a smaller PL from the gNB.

12. The system of claim 9, wherein the operations further comprise:

before the gNB receives the message preamble from the UE, selecting, by the UE, which preamble type to use for the message preamble based on an estimated PL between the gNB and the UE, wherein a first preamble type is associated with the UE experiencing a larger PL from the gNB and a second preamble type is associated with the UE experiencing a smaller PL from the gNB.

13. The system of claim 12, wherein the selecting which preamble type to use includes:

selecting, by the UE, to use the first preamble type for the message preamble in instances where the estimated PL between the gNB and the UE is larger than a threshold; and selecting, by the UE, to use the second preamble type for the message preamble in instances where the estimated PL between the gNB and the UE is equal to or smaller thana the threshold.

14. The system of claim 13, wherein the operations further comprise:

dynamically adjusting the threshold based on a success rate of communications via the RACH with the UE using the determined AL and MCS.

15. The system of claim 12, wherein the operations further comprise:

adjusting a number of preambles allocated for the first preamble type based on utilization of the first preamble type in communications via the RACH with the UE; and adjusting a number of preambles allocated for the second preamble type based on utilization of the second preamble type in communications via the RACH with the UE.

16. The system of claim 9 wherein the preamble type is determined from a plurality of preamble types including a 5G NR Group A preamble type and a 5G NR Group B preamble type.

17. A non-transitory computer-readable storage medium having computer-executable instructions stored thereon that, when executed by at least one processor, cause a system to perform operations including:

receiving, by a Next Generation Node B (gNB) in a fifth generation (5G) New radio (NR) wireless network, a random access channel (RACH) message preamble from a user equipment device (UE) on the 5G NR network;

determining, by the gNB, which preamble type the message preamble is;

determining, by the gNB, an Aggregation Level (AL) and a Modulation and Coding Scheme (MCS) to use for the UE and gNB to exchange subsequent messages during a RACH phase based on which preamble type the message preamble is; and the gNB communicating via the RACH with the UE using the determined AL and MCS;

wherein the determining the AL and the MCS to use includes:

determining, based on which preamble type the message preamble is, an estimated Path Loss (PL) between the UE and the gNB; and determining, by the gNB, the AL and the MCS to use for the UE and gNB to exchange subsequent messages during the RACH phase based on the estimated PL between the UE and the gNB determined according to the preamble type.

18. The non-transitory computer-readable storage medium of claim 17 wherein the estimated Path Loss is determined using a configurable threshold.

19. The non-transitory computer-readable storage medium of claim 18 wherein determining, by the gNB, the AL and the MCS to use for the UE to access the gNB includes:

determining to use a higher level of aggregation and lower MCS in response to the preamble type being determined to be a first preamble type that is associated with the UE experiencing a larger PL from the gNB relative to using a lower level of aggregation and higher MCS in response to the preamble type being determined to be a second preamble type associated with the UE experiencing a smaller PL from the gNB.

20. The non-transitory computer-readable storage medium of claim 17, wherein the operations further comprise:

before the gNB receives the message preamble from the UE, selecting, by the UE, which preamble type to use for the message preamble based on an estimated PL between the UE and the gNB, wherein a first preamble type is associated with the UE experiencing a larger PL from the gNB and a second preamble type is associated with the UE experiencing a smaller PL from the gNB than a configurable threshold.

* * * * *